United States Patent [19]
Herz

[11] 4,372,793

[45] Feb. 8, 1983

[54] METHOD OF JOINING FLEXIBLE FASTENER STRIPS TO FLEXIBLE WEB

[75] Inventor: Andre M. Herz, Nesles-la-Vallée, France

[73] Assignee: Minigrip, Inc., Orangeburg, N.Y.

[21] Appl. No.: 324,582

[22] Filed: Nov. 24, 1981

Related U.S. Application Data

[63] Continuation of Ser. No. 737,141, Oct. 29, 1976, Pat. No. 4,341,575.

[30] Foreign Application Priority Data

Nov. 3, 1975 [FR] France ................................ 75 33593

[51] Int. Cl.³ ............................ B30B 3/02; B29D 7/02

[52] U.S. Cl. ...................................... 156/66; 156/204; 156/227

[58] Field of Search ................ 156/66, 244.22, 244.27, 156/324, 356, 500, 520, 551, 554, 64, 204, 217, 226, 227, 200; 118/672, 679

[56] References Cited

U.S. PATENT DOCUMENTS

| | | | |
|---|---|---|---|
| 3,008,862 | 6/1956 | Haine et al. | 156/244 |
| 3,219,084 | 11/1965 | Ausnit et al. | 150/3 |
| 3,374,137 | 3/1968 | Wiener | 156/332 |
| 3,839,128 | 10/1974 | Arai | 156/583 |
| 3,844,878 | 10/1974 | Price | 161/190 |
| 3,853,665 | 12/1974 | Gardziella | 156/332 |
| 3,948,705 | 4/1976 | Ausnit | 156/73.4 |
| 3,988,184 | 10/1976 | Howard | 156/66 |

*Primary Examiner*—David A. Simmons

*Attorney, Agent, or Firm*—Hill, Van Santen, Steadman, Chiara & Simpson

[57] ABSTRACT

Extruded flexible fasteners are secured to thin plastic film by adhesive, attaining high speed production and permitting diverse materials which might not be compatible for fusion bonding to be used in the fasteners and the films, respectively.

17 Claims, 20 Drawing Figures

METHOD OF JOINING FLEXIBLE FASTENER STRIPS TO FLEXIBLE WEB

This is a continuation of application Ser. No. 737,141, filed Oct. 29, 1976, now U.S. Pat. no. 4,341,175.

This invention relates to method of joining separable flexible fasteners to plastic film or web.

For various purposes, and especially for the manufacture of plastic bags, mating profiled fastener strips are joined to plastic web or film, both the fastener strip and the film being produced by extrusion of suitable plastic material through suitable dies. The joined fasteners and film may be made into various products, and find extensive use in the manufacture of bags, the fasteners being of either the type which can be joined to provide a closure by finger pressure or by means of a slider, the profiles of the fasteners being elastically deformable for this purpose.

Bags obtained by use of such material may comprise two thin film walls joined along opposite sides to form the tubular body of the bags and if desired a third side constituting the bottom of the bag may also be closed, or such bottom may remain open until the bag has been filled with a contents such as merchandise. Two contiguous edges of the bag walls are separable from each other along the end or side opposite the bottom in order to provide an access opening to the interior of the bag, and the separable edges have therealong complementary closure profile fasteners capable of being joined with each other by pressure exerted along the fasteners strips or by means of a slider. Various arrangements of the mating profiles may be provided, as will become more apparent hereafter.

Bags of the type described have been employed for packaging and retailing of mass consumption products such as food, clothing, tools, etc., and are generally of a transparent plastic material to permit observation of the contents.

According to one prior method of manufacture, the plastic film and fastener strips are formed in a common extrusion operation. This is a relatively slow process and difficult to implement, primarily because of the great difference between the thickness of the film and the mass of the fastener strips. Generally in that method the material of the fastener strips and the film is the same.

According to second prior method of manufacture, the film and the fastener strips are extruded separately, generally at different speeds and under different control conditions as to temperature, and the like, and the fastener strips are then fixed to the film by fusion, either by direct application of heat or by ultrasonic welding, and the like. Generally, it is necessary for the film and the fastener strips to be made from the same material because it has been found practically impossible to fuse two different plastic materials to one another.

As to either of the two prior expedients noted, a great disadvantage is that it is impossible to choose the plastic material most appropriate for the mechanical or optical qualities desired in either or both of the fastener strips and the film. For example, it is impossible to produce bags wherein the walls are made from polypropylene, which is particularly advantageous because of its transparency but lacking in elasticity, and form the fastener strips from polyethylene which is a more opaque material but advantageous because of its suppleness and resilience.

Other disadvantages of the fusion or welding process are that where the fastener strips are welded onto folded web, as in bag making, it is necessary to have an insulating bar disposed between the film plies so that they will not be welded together. The presence of such an insulating bar creates difficulties in the apparatus and imposes friction factors preventing operation at high speed. Also, the welding temperature is very critical because necessarily the film is thin and the profile fastener strips are thicker so that if the temperature is too low attachment is insecure and if it is too high there is the risk of burning the plastic material. Thereafter, upon cooling, wrinkling of the thin film occurs due to the more rapid cooling of the film than the greater mass fastener strips, so that the product such as a bag has an unsatisfactory appearance. In addition, it is impossible to attain attachment of the fastener strips across that entire width because the area behind the profile lock cannot be welded onto the film aligned with said profile, but only the web flanges extending along the profile, can be welded to the film whereas it is the profile which is directly subjected to the strains of opening or closing the fasteners. Finally, in some instances the walls of the product such as bags bear imprinted indicia such as trademark of the product, and the like, and during welding there is the risk of damaging the inscriptions and the ink may come off onto the clamping mechanism. It has heretofore been necessary for manufacturers to accommodate themselves to these disadvantages which have been considered inescapable and inherent in the method, and so far as I am aware no remedy has heretofore been suggested.

It is, accordingly, an important object of the present invention to overcome the disadvantages, deficiencies, inefficiencies, shortcomings, and problems inherent in prior methods and apparatus and to provide a continuous and rapid process for joining and attaching profile fastener strips to film web traveling at high speed and intended, for example to provide the walls of bags or other articles and in particular to permit choice of different kind and thickness and optical and mechanical properties of the film webs and of the fastener strips.

According to features of the invention a new and improved method of and means are provided for applying adhesive continuously to and between the interfaces of prefabricated fastener strips and prefabricated webs, and to which the adhesive is applied while the webs and the strips are traveling at high speed and preferably substantially continuously. By the expression "high speed" it is intended to mean a speed substantially greater than has been practicable when practicing the welding method, and in particular speeds according to the present invention on the order of at least 100 meters per minute. By the expression "substantially continuously" it is intended to mean that a cement or adhesive such as plastic material of the type called "hot melt" is deposited in a continuous fashion while the strip or strips and the film web or webs are in a continuous motion, even though the film webs and strips may possibly have to be stopped periodically as for example to replace supply reels or rolls, requiring a corresponding halt in the adhesive supply while supply reel replacement is in progress.

Another object of the invention is to enable the high speed joining of prefabricated extruded flexible separable fasteners whether of the pressed together or slider fastener type to prefabricated plastic or other types of film or web material by virtue of the elimination of the need for fusing of the fastener and web materials.

In accordance with such object, the invention features the joining of the film web and the fastener strips by moving them continuously into engagement with one another, and at a location upstream from the point of meeting applying adhesive continuously either to the film or web but preferably to the fastener strips. The bonding agent such as glue or adhesive is preferably deposited on the profiled fastener strips because they are thicker than the film or web and have greater firmness, and depositing of the bonding agent does not risk causing even a slight deviation from the path of movement due to any pressure that may be encountered in application of the bonding agent.

A further object of the invention is to permit choice of the most appropriate material for the film and for the profiled fastener strips, disregarding differences not only in the character of the material, but also in the thicknesses of the film or web and the fastener strips.

In accordance with the foregoing object, it is practical to select polypropylene for the film and polyethylene for the fastener strips. It is even practical to utilize a film or web of a non-weldable material such as paper, a composite film of plastic material and paper or aluminum foil, the fastener strips being selectively attachable to the plastic material face or to the non-plastic material face of the web. Thereby, large numbers of selective possibilities and various film fastener combinations are obtainable.

Yet another object of the invention is to eliminate the necessity for the stop and go method of welding the film to the fastener strips that has often been necessary in the hot welding clamp process, and to provide a method and apparatus according to which any pressure that may be desirable to effect bonding can be continuous and carried out at high speed.

Inasmuch as the adhesive can be applied to the entire width of the fastener strips including the area behind the locks or profiles, attachment of the strips to the film or web over their entire width is effected, thereby resulting in a more secure attachment and improved mechanical firmness of the fastener profiles.

In addition, where imprinted film is utilized, there is no risk of deterioration of the printing the present invention is utilized, in contrast to the hot welding technique heretofore employed.

According to one manner of practicing the invention, the fastener strips may be bonded by cementing to the film while the film is in a relatively flat condition, and the film subsequently folded along a fold line parallel to the axis of movement of the film and fastener strips, so as to bring the fastener strips into relative position for interlocking of the fastener profiles. In this way either two separate complementary profiled fastener strips may be adhesively secured in parallel relation adjacent to the intended fold line, and bags made from such product after folding having open bottoms so that they can be filled and when sealed closed across the bottom form a complete enclosure so that the contents are tamperproof and access into the enclosure can only be obtained by cutting the bag. Also the profiled complementary fastener strips can be adhesively bonded along opposite edges of the film and the film then folded to provide a closed bottom, open top bag so that filling may be effected through the opening between fastener strips the profiles of which may then be interlocked to effect a closure for the bag. In addition, two profiled fastener strips which have their profiles joined together in locking relationship may be respectively adhesively fastened along parallel traveling adjacently spaced films, which may then be folded toward one another to make bags.

The invention also lends itself to the attachment of one or a plurality of strips containing complementary profiles wherein said strips can be folded longitudinally so that the profiles are interlocked or are ready to be interlocked with the profile strips being secured by means of adhesive layers at their interfaces along adjacent lateral edges to two film layers. Bags made from this assembly would be of the tamperproof type since it is necessary to cut the fastener strips along their longitudinal fold line between the profiles in order to open the bags.

Numerous and varied other arrangements of flexible separable fastener strips and film or web (the terms "film" and "web" wherever used herein being understood to mean any suitable pliable sheet material to which flanged, profiled, separable flexible fasteners can be advantageously applied) are obtainable due to the advantageous adaptability of the adhesive attachment of the fastener strips to the webs, as will become apparent as the description proceeds.

Adhesive attachment of the fastener strips may be effected where the complementary profiles are on separate strips, with said separate profile strips being fastened together so as to facilitate adhesive attachment of the fastener strips to the web material, or where the complementary profiles are on the same strips which are then folded to bring the profiles into engagement thereby providing numerous desirable combinations.

The profiles of the strips may be employed to assist in guiding the strips into position for adhesive attachment.

Adhesive attachment of the strips to the web may be effected at high speed and the resulting assembled product rolled up on supply reels, for subsequent processing into bags or other articles and which may be effected at slower speed. For example, whereas cemented assembly of strips and film or web may be effected in one line, due to the high speed of production, the resulting output of the one line may be rolled up in reels and utilized in a plurality of bag forming and/or filling lines, thus attaining high productivity at low cost.

New and improved apparatus are provided for practicing the invention.

The inventive process results in a new and improved product comprising a web material having the flexible fasteners cemented thereon, and new and improved bags made from said web material with cemented profiled flexible fastener strips thereon.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIGS. 1*a* and 1*b* demonstrate one manner of practicing the method according to the present invention;

FIGS. 2*a* and 2*b* show another manner of practicing the method of the invention, utilizing a single closure strip having two complementary interlocking profiles thereon;

FIGS. 3*a* and 3*b* show a further manner of practicing the invention utilizing multi-profile closure strips;

FIGS. 4*a* and 4*b* show still another manner of practicing the invention with multi-profile closure strips;

FIG. 5 discloses yet another modification in the practice of the method of the invention;

Figure 10:
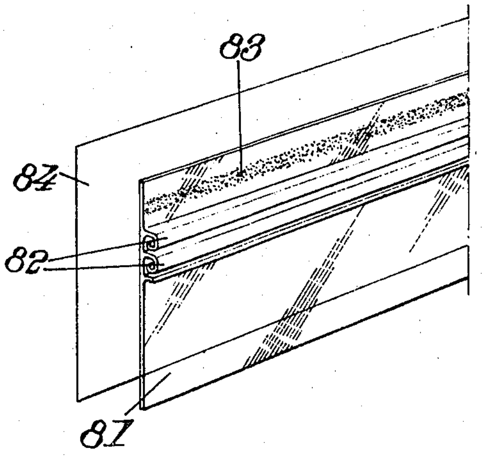
Figure 11:
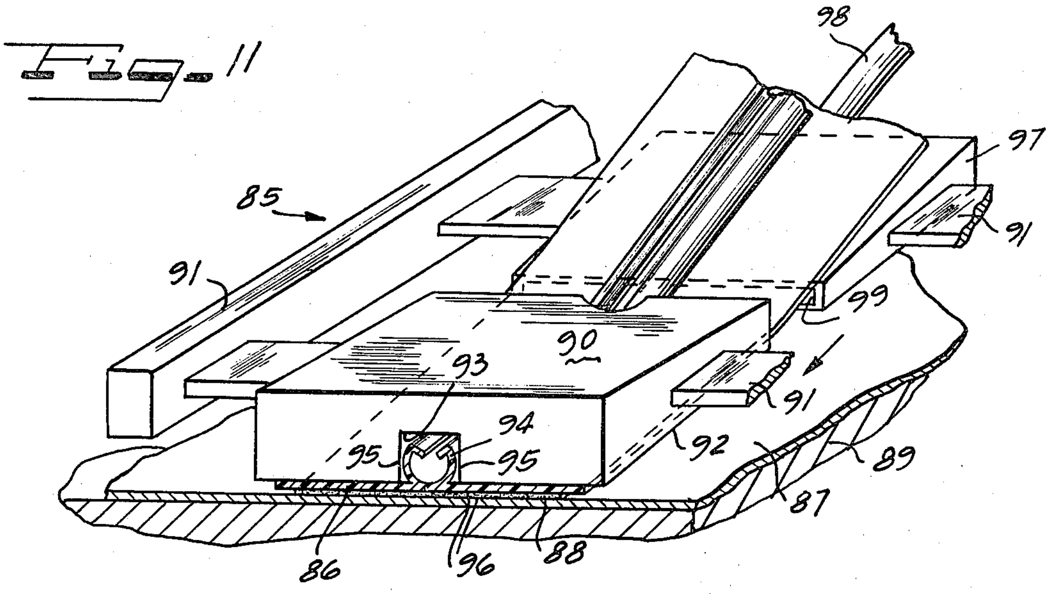
Figure 12:
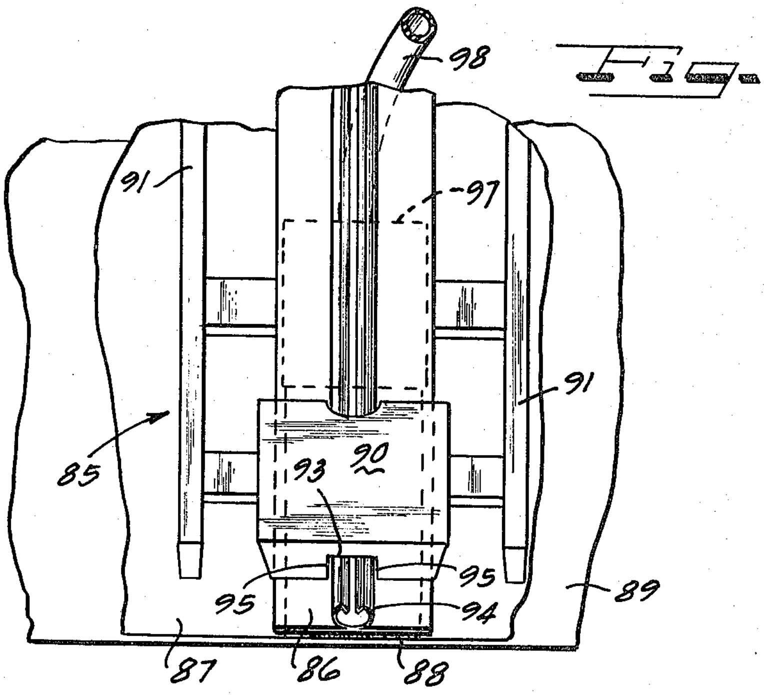

FIGS. 9*a*, 9*b*, 9*c* and 9*d* are more or less schematic cross sectional views showing spaced parallel films onto the inside or confronting faces of which profiled fastener strips are adhesively secured in accordance with the present invention, and which are especially useful for fabrication of bags;

FIG. 10 represents a product according to the invention comprising a profiled fastener strip adhesively secured on a protective film;

FIG. 11 is an isometric fragmentary sectional elevational view showing a modification in the method and apparatus for joining a fastener strip to a film or web utilizing the profile as guiding means for the strip;

FIG. 12 is a top plan view of the assembly in FIG. 11; and

Figure 13:
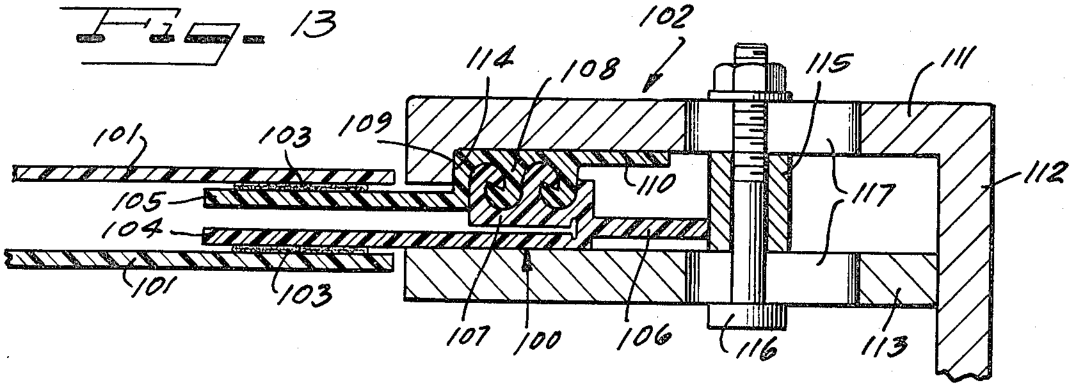

FIG. 13 is a fragmentary sectional detail view showing an adjustable guide for coupled profiled flexible fasteners adhesively secured to film or web material.

Figure 1A:
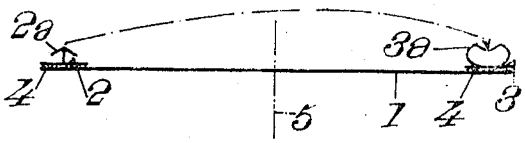
Figure 1B:
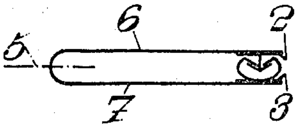

In FIG. 1*a*, a thin film web 1, for example extruded polypropylene, is advanced in a continuous fashion at high speed along the direction of its longitudinal axis, namely a direction perpendicular to the plane of the drawing. Parallel thereto, and in the vicinity of each of the free edges of the film 1, two resiliently flexible separable closure or fastener strips 2 and 3 are advanced at the same speed, one of which has a male interlocking profile 2*a* and the other a female interlocking profile 3*a*, and both of which have the customary attachment flange structure on which the profiles are integrally carried. These two strips are also of plastic material, for example extruded polyethylene. A layer 4 of an appropriate bonding medium, i.e. adhesive, which may be of the type commonly referred to as "hot melt" is deposited in a continuous fashion on those flanges or faces of the strips which are opposite their profile, and those faces are applied and adhesively secured to the film 1. Then, in a first stage, the film is folded along its longitudinal axis, represented by the broken line 5. A folded film such as the one represented in the FIG. 1*b* is then obtained with profiles 2*a* and 3*a* being brought into facing relation to one another and being eventually interlocked. After that, in a second stage, the two opposite walls 6 and 7 are transversely cut and joined, for example by welding, at predetermined intervals corresponding to desired bag widths. Thereby, bags with a closed bottom are obtained. It may be noted that in the welding procedure the ends of the closure strips 2 and 3 are also welded together at the same time as the walls 6 and 7 since they are opposite one another.

Figure 2A:
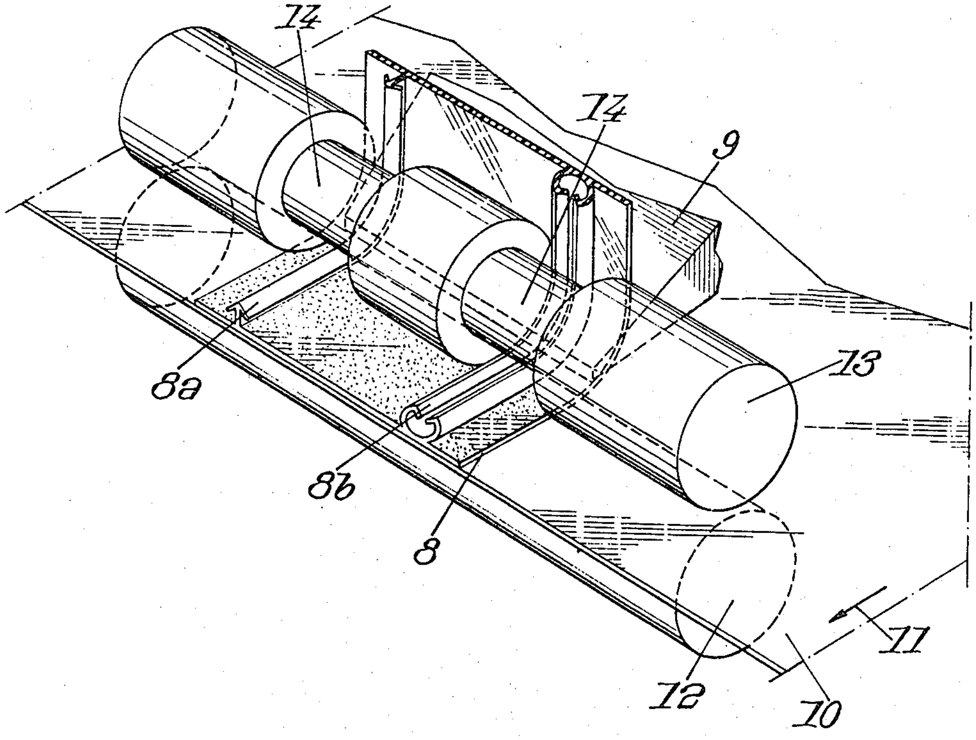

In FIG. 2*a*, a variation is schematically represented, according to which a single fastener strip 8 is utilized, made in one piece, for example by extrusion, but which comprises two complementary interlocking profiles 8*a* and 8*b*. On the strip flange, whose face is opposite to the profiles, a thin layer of adhesive is deposited by means of a nozzle 9 fed, in any preferred manner not shown, from an adhesive reservoir.

As shown, at least the transversely elongated narrow orifice of the nozzle 9 is located parallel to the interface areas of the strip 8 and the film web 10 and as close as practicable to the convergent joining of the interface area of the strip 8 with the interface area of the web 10, and the thin layer (e.g. 1/10 mm thick) of adhesive applied through the nozzle orifice extends between the sides of the strip 8 and fully under the profiles 8*a* and 8*b*. The adhesive carrying strip face is then brought into contact with a prefabricated plastic film web 10, along the travelling or longitudinal axis of the film, with both it and the prefabricated strip 8 travelling at the same high speed (in the direction of the arrow 11). For effecting high speed movement and guidance of the film 10 and the strip 8, a rotary pressure roll 12 has been provided underneath the strip and above it a rotary pressure roll 13. The latter includes two annular grooves 14 which provide for the passage of, and effect straight guidance of the profiles 8*a* and 8*b*.

Figure 2B:
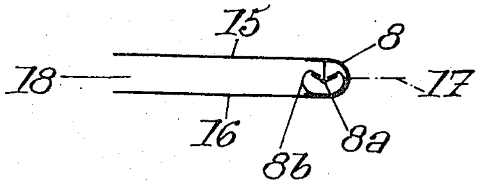

Then the film 10 and the strip 8 are folded along the axis of the film, namely along a longitudinal central line passing between the two profiles, as a result of which a folded film with two opposite walls 15, 16 is obtained, such as that which is represented in FIG. 2*b*. The broken line 17 indicates the fold line. The two profiles 8*a* and 8*b* can be interlocked at the time of the folding of the film, and more particularly the folding of the two walls 15, 16 against one another. Consequently, after the operation of transverse severance and joining of the walls 15, 16 at predetermined spaced intervals, separate bags with an open bottom 18 are obtained, and through which open bottom they can be filled. It is to be noted that the bags obtained in this manner will have at the end opposite the bottom, a security closure, corresponding to the central section of the strip 8 and which the user will have to cut before having access to the fastener profiles in order to separate them, and then to the contents of the bag. In order to facilitate such separation it may be preferred to provide one or two lines of weakness extending along said central part of the strip.

Figure 3A:
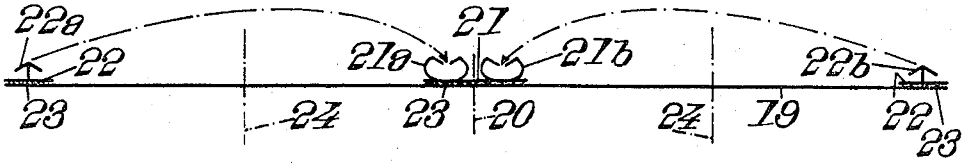
Figure 3B:
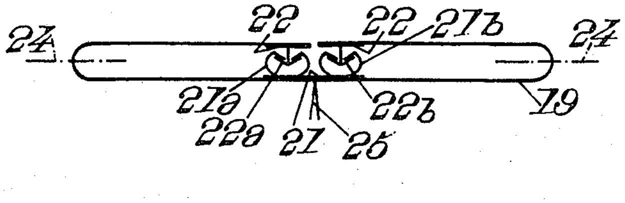

In FIG. 3*a*, another variation has been represented, according to which a fastener strip 21 comprising two noncomplementary (for example, of a female type) interlocking profiles 21*a* and 21*b* are conveyed, in continuous transport, onto one face of a film web 19 along the longitudinal travelling axis of the film (represented by the interrupted line 20), while at the same time applying on the same face of the film along each of its longitudinal edge portions respective fastener strips 22 comprising interlocking profiles 22*a* and 22*b* respectively, said profiles being of the male type and complementary to the profiles 21*a* and 21*b*. Of course, before effecting attachment contact between the film 19 and the flange faces of the strips 21 and 22 which are opposite their profiles, there has been deposited on these faces a thin layer of adhesive 23. Then the film 19 is folded along two longitudinal lines 24 intermediate the attached strips 21 and 22 so that the profiles 22*a* and 22*b* come opposite the profiles 21*a* and 21*b* and may be interlocked with them. Then, if desired and preferably in a continuous fashion, the film 19 and the central portion of the strip 21 may be cut longitudinally along axis 20 by means of a knife 25. After transversal cutting and joining of the film and the strips, two sets of separate bags with closed bottoms are obtained, analogous to those in FIG. 1*b* or, if the longitudinal cutting is not performed, double small bags of the "pocket-book" type are obtained.

Figure 4A:
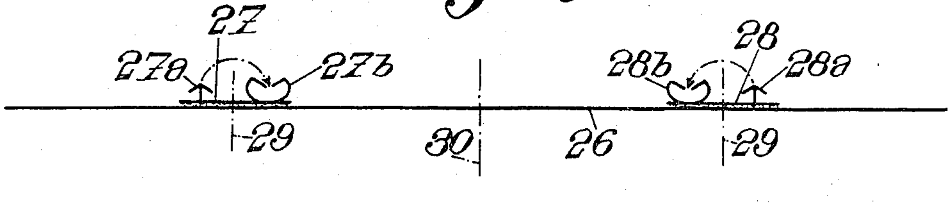
Figure 4B:
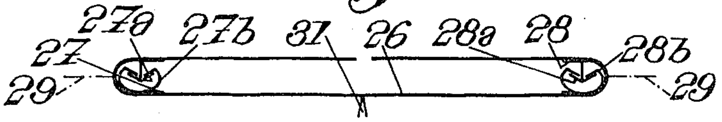

In FIG. 4*a*, yet another variation has been depicted, according to which two fastener strips 27 and 28 while in continuous transport, are applied and fixed, by cementing, i.e., adhesively, onto a film web 26 along two longitudinal lines 29 of said film, situated in substantial spaced relation at opposite sides of its longitudinal axis 30. Each strip 27 and 28 consists of a male profile, respectively 27*a* and 28*a*, and a female profile, respectively 27*b* and 28*b*. The film 26 and the strips 27 and 28 are then longitudinally folded along the lines 29 so that the profiles 27*a* and 27*b* on one side, and 28*a* and 28*b* on the other side come opposite each other and may be interlocked (FIG. 4*b*). After that fastener carrying film 26 is adapted to be transversely sealed and cut longitudinally at suitable intervals along its axis 30 by a knife 31. In this way, two sets of bags with an open bottom can be obtained, as in the case of FIG. 2*b*.

Figures 5, 6:
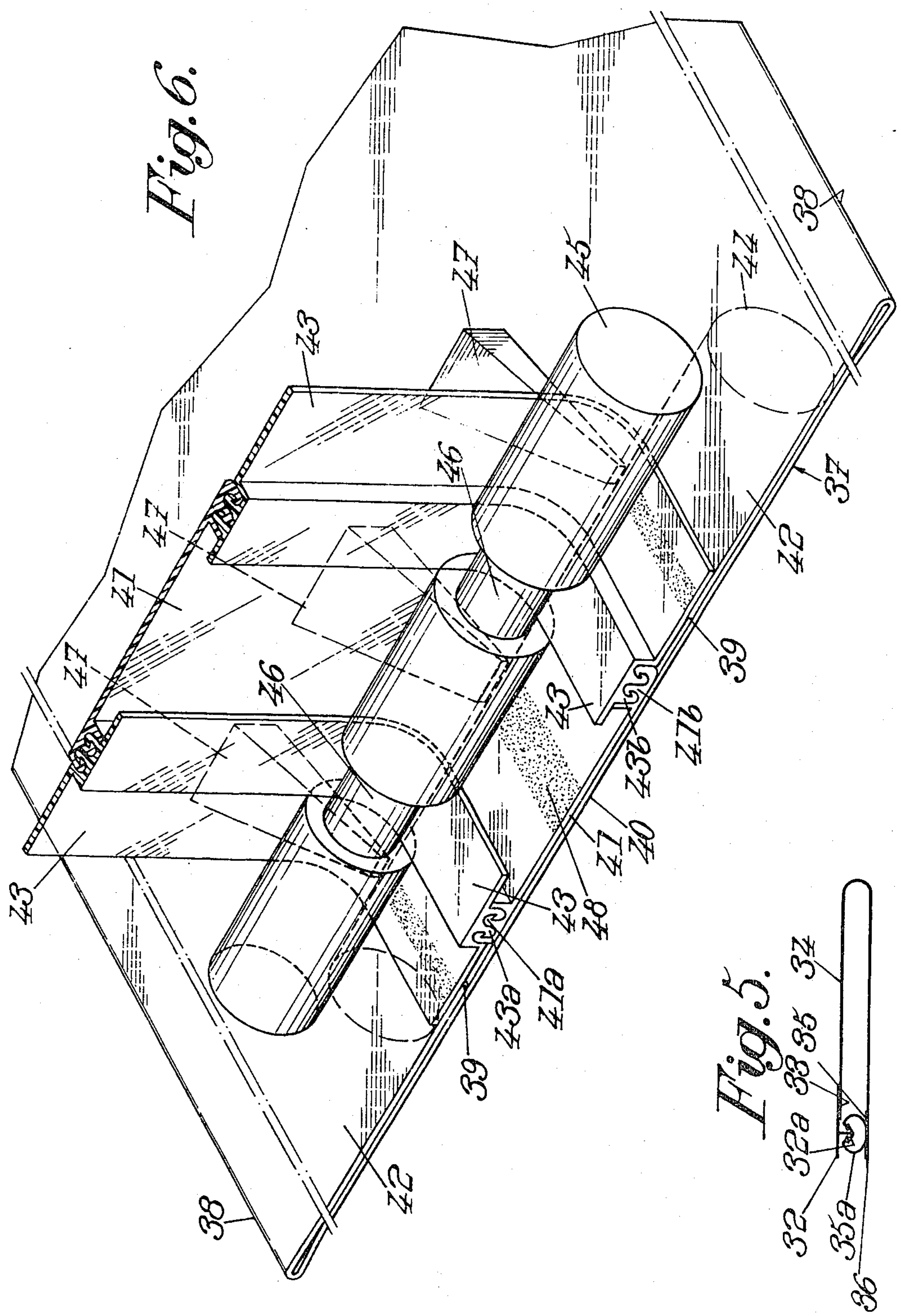
FIG. 6 illustrates a still further modification in the method showing how two pairs of coupled profile strips may be used for attachment to the film after folding of the film.

In the embodiment of FIG. 5, a different procedure is followed, in that one of the flexible fastener strips, for example a strip 32 with male profile 32*a* is coated with a layer of adhesive on the flange face which is on the same side as the profile, and this strip is then cemented onto one of the longitudinal edges 33 on the outer side of an already folded film web 34 so that the profile 32*a* projects toward the opposite edge 36 of the web 34. Concurrently a fastener strip 35 with female profile 35*a* is cemented on the inner side of the opposite longitudinal edge 36 of the film web 34. Here again, separate bags with a closed bottom may be obtained, wherein the fastener strip 32 will be visible from the exterior, independently of the fact that the walls of the bags may be transparent.

Means for making bags generally according to the embodiment of FIG. 5 with some desirable variations, is represented schematically in FIG. 6. Therein, a wide film web 37 is initially folded continuously along two longitudinal lines 38 at opposite spaced distances from its travelling axis, so that the two longitudinal free edges 39 of the film are directed toward each other in parallel relationship. A fastener strip 41, comprising two adjacently spaced parallel noncomplementary interlocking profiles 41*a* and 41*b*, is applied and cemented onto the continuous internal face 40 of the lower fold of the film web. At the same time respective fastener strips 43 with interlocking profiles 43*a* and 43*b* complementary to the profiles 41*a* and 41*b* are applied and cemented along the edges 39 of the film and on the upper external faces 42 of the upper separated folds of the film web. Preferably, interlocking of the profiles 41*a* and 43*a* and profiles 41*b* and 43*b* is accomplished before application and cementing of the strips onto the film web 37. In order to effect guidance and pressing together of the film web and the fastener strips, a rotary pressure roller 44 has been provided beneath the film 37 and a rotary pressure roller 45 above the film and the strips 41 and 43. The roller 45 has annular grooves 46 providing opposed spaced guide surfaces with which the sides of the profiles cooperate in guiding the strips accurately into the attaching position on the film 37. On either side of each of the grooves 46, the roller 45 presses the attachment flange portions of the fastener strips 41 and 43 and the film web 37 against the roller 44 to effect thorough bonding of the strips to the web, in the nip of said rollers. Three delivery nozzles 47 are provided for applying adhesive simultaneously to the faces of the flanges of the strips which are to be secured to the film. When the cementing step has been completed, a longitudinal severance cut along the film 37 and the strip 41 is effected, substantially in the middle of the longitudinal cementing area 48. As a result, after transversal seals and severances of the united assembly, two sets of bags with a closed bottom of the type represented in FIG. 5 are obtained at a high speed production rate.

Figure 7:
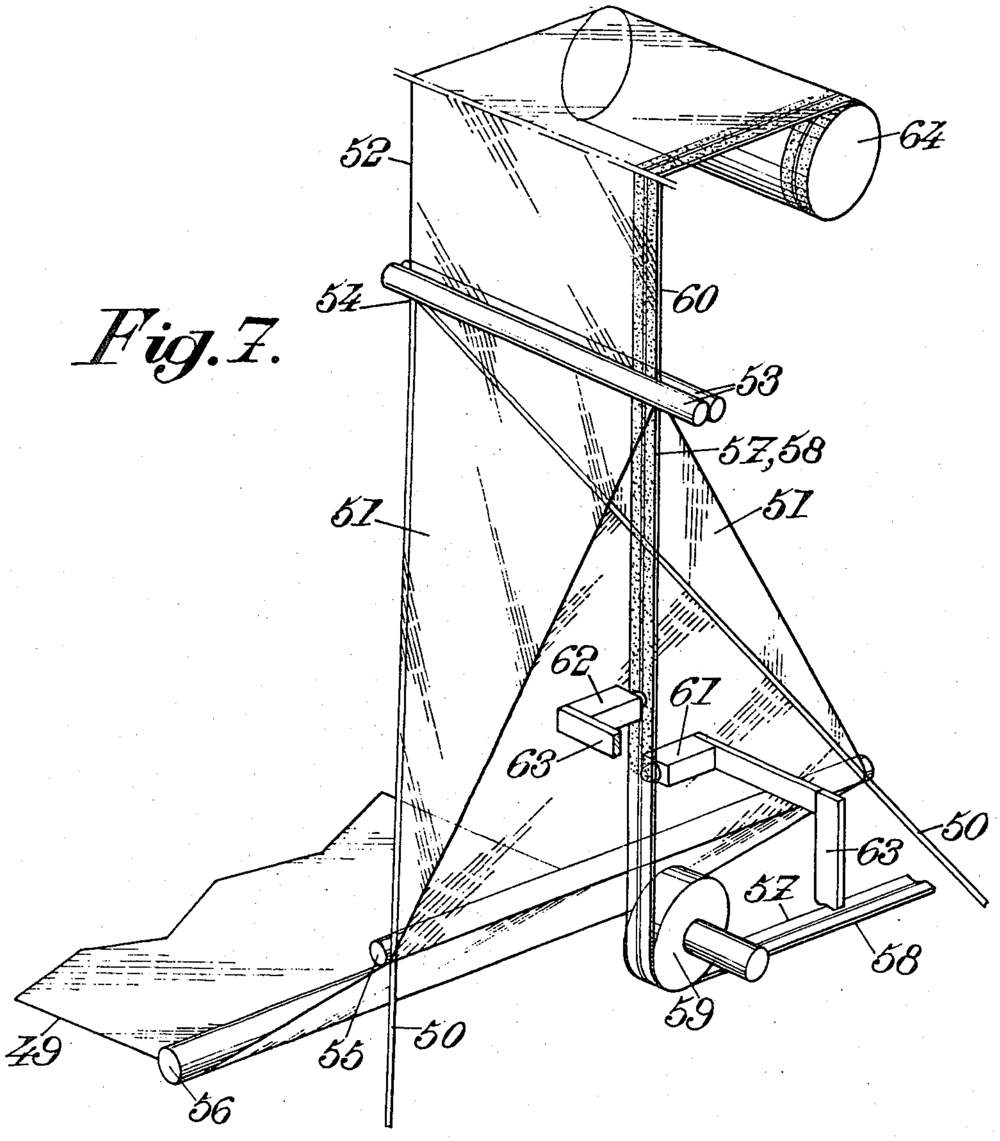
FIG. 7 is an isometric, schematic view of a machine for practicing the method according to the present invention.

In FIG. 7 apparatus has been represented schematically for practicing the method according to the invention at high speed. The machine represented is supplied with a plastic film web 49 unrolling in a continuous fashion and at high speed from a reel not shown. The film 49 is folded by means of a usual triangular folder device 50 to form two folds 51 connected by a fold line 52. The two folds 51 progressively approach each other to finally join each other at two guidance rollers 53 which extend horizontally starting at the upper point 54 of the folder 50. Two rollers 55 and 56 cooperate to guide the film 49 onto the folder 50. In addition, the apparatus is supplied from reel means (not shown), with profile carrying fastener strips 57 and 58, whose complementary profiles are interlocked in such a way that these two strips act like a single strip 57–58 thereby presenting smooth flange surfaces on both sides of the interlocked profiles. The strip 57–58 passes over a roller 59, and then between the two rollers 53 is such a way that it engages between the two free edges 60, which face each other, of the two folds 51 where these come together. In this way, and very conveniently, the strip 57–58 is sandwiched between the longitudinal free edges 60 of the folds 51 of the film 49.

Upstream from the point where the fastener strips 57–58 joins the two folds 51, that is to say, ahead of the rollers 53, two adhesive delivery nozzles 61 and 62 are supported by a fixed support 63, as is represented fragmentarily in FIG. 7. These two nozzles are supplied with a liquid adhesive in any preferred manner (not shown), for example by flexible tubing joined to a reservoir of heated liquid adhesive, the tubing and reservoir being preferably insulated in order to avoid premature cooling and polymerization of the adhesive. The nozzles 61 and 62 discharge adhesive onto the respective smooth surfaces of the opposite flange faces of the strips 57–58 in such a way that said adhesive is spread uniformly proportionately and in a thin layer on these two surfaces. Thereby, adhesion of the fastener strips 57 and 58 to the internal faces of the folds 51 along their free edges is attained. The film thus folded and provided with the two closure strips 57 and 58 may be finally rolled up on a reel 64, or may be introduced into a welding machine for forming into bags.

It may be observed that all the operations which have just been described in connection with the apparatus of FIG. 7 can proceed continuously and at very high speed, without any interruption nor any slowing down in the movement of the film 49. This speed can attain values on the order of 200–300 m/mn and is considerably greater than that which can be attained with machines of the type for attaching the closure strips by welding. The production speed is so great that a plurality of the reels 64 of product produced by means of the FIG. 7 apparatus has to be processed by several standard slower operating bag machines working in parallel and effecting the operations of transverse welding and severing at regular intervals, of the folded web and the closure strip assembly. As a result individual bags of the type in FIG. 1*b* are produced at a high production rate.

Figure 8:
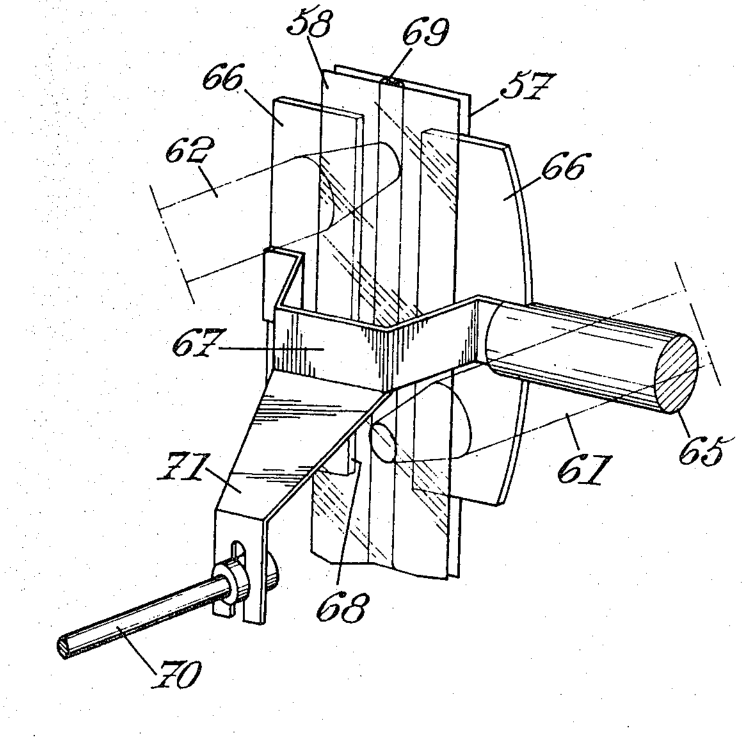
FIG. 8 is an isometric fragmentary schematic illustration showing guide means for two interlocked profiled fastener strips, and which may be used on the machine in FIG. 7.

The machine represented in FIG. 7 is desirably provided with means for guiding the strips 57–58 between the nozzles 61 and 62. Such means have been depicted separately in FIG. 8, so as not to complicate FIG. 7. The nozzles 61 and 62 are slightly vertically offset in relation to each other, and the guide means are arranged to assure an accurate lateral guidance of the strips 57–58 as well as to be able to pivot around a horizontal axle shaft 65 situated at an intermediate level between the nozzles 61 and 62 so that the strips can be simultaneously deflected and removed from the discharge field of the orifices of the two nozzles at the moment the machine stops. This prevents the relatively elevated temperature at the nozzles from deteriorating the halted strips 57–58. To accomplish this, the guide means as schematically represented may comprise two guide plates 66 connected by a bridge-like cross-piece 67 fixedly connected to the shaft 65 and having between them a gap 68 for the passage of the releasably interlocked profiles 69 of the strips. The adjacently spaced edges of the plates 66 are positioned between the slightly separated flanges of the strips 57 and 58, which provides for excellent guidance of the strips and enables separating the strips sufficiently from the two nozzles 61 and 62 upon rotation around the axis of the shaft 65. This rotation can be automatically controlled, for example by means of a solenoid whose armature 70 is coupled to a flange 71 of the bridge-like cross-piece 67. Other guidance means could be provided to fulfill these same functions.

In FIGS. 9*a* to 9*d* other variations of product capable of being obtained in conformance with the invention have been represented in cross-section. According to these variations, the interlocking profile fastener strips, preferably already interlocked, are not secured between the two folds of a film as in other modifications described herein but rather are secured between two separate films 72–73, which are transported parallel to each other.

Figure 9A:
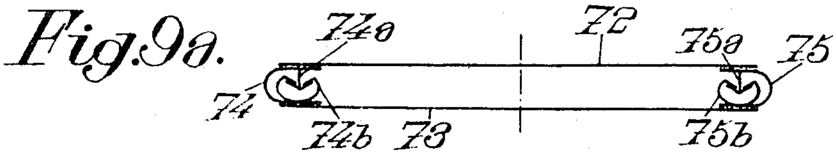

In FIG. 9*a* the two films 72–73 have the same width: Two complementary separably interlocked profile fastener strips 74, 75 are attached therein by cementing them to and between the facing surfaces of the films. The strip 74 comprises a male profile 74*a* and a female profile 74*b* which are interlocked. The strip 75, similarly, comprises a male profile 75*a* and a separably interlocked female profile 75*b*. The strips are folded longitudinally between the two profiles thereon, with fold of the strip being directed outward relative to the assembly.

It is thus seen that after the longitudinal severance of the two films along their common longitudinal axis and the transverse welding and severance, two sets of bags with an open bottom end will be obtained, and with a tamper-proof closure at the other, top end. In fact it will be necessary for the user to sever the strips 74, 75 between their profiles in order to have access to the profiles and to disengage them.

Figure 9B:
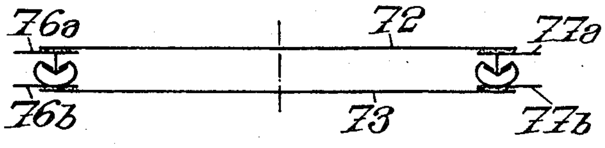

FIG. 9*b* differs from FIG. 9*a* in that two separated profile strips, respectively 76*a*–76*b* and 77*a* and 77*b* are used. Here also, two sets of bags with an open bottom will be obtained, but without a top end tamper-proof closure.

In FIGS. 9*a* and 9*b*, the profiled strips are adhesively attached along the lateral edges of the two films.

Figure 9C:
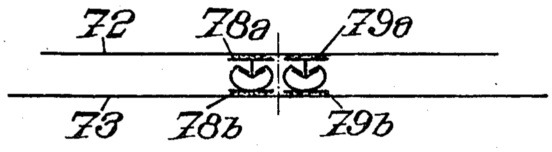
Figure 9D:
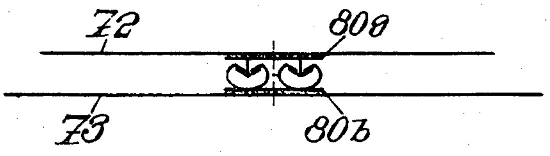

In FIGS. 9*c* and 9*d*, by contrast, the profiled strips are attached on the longitudinal central area of the two films 72 and 73 at opposite sides of the common longitudinal axis. The film 72 may be narrower than film 73. In FIG. 9*c*, two pairs of separate strips 78*a*, 78*b*, and 79*a*, 79*b* are provided. In FIG. 9*d*, a single profile strip is cemented onto each film, with strip 80*a* having two male profiles and the other strip 80*b* having two complementary female profiles. In these two forms, after longitudinal cutting of the two films along their common axis, and transverse joining and severance of the films and strips, two sets of bags with an open bottom and offset edges will be obtained. The offset edges facilitate separation of the two walls of the bags during the process of opening or filling them.

It may be noted that the four immediately preceding embodiments in FIGS. 9*a*–9*d* afford the advantage of selectively providing the films 72 and 73 in different colors.

As has been indicated hereinbefore, the present invention is not only adapted for the fabrication of bags but is also adapted for other uses. As represented in FIG. 10, another type of product capable of being manufactured pursuant to the invention, comprises a flanged plastic fastener strip 81, for example made of polyethylene, provided with two interlocking profiles, 82, in the form of ribs and grooves, and with a band of pressure sensitive adhesive 83 deposited thereupon in line with the profiles, but on the back face of the strip 81 and opposite said profiles. The adhesive 83 similarly to precedingly described embodiments can be deposited in a continuous fashion during longitudinal transport of the strip. The layer of adhesive 83 is covered with a protective backing which can be readily stripped by the user before use. A profiled fastener strip of this type, after removal of the protective paper strip, can then be fastened onto any appropriate surface such as a wall by a simple application of pressure. One can then join to this strip any product provided with complementary profiles, for example a sheet of plans, a curtain element or something else, the advantage of such a product being that it is easy to put in place and remove, by simply interlocking the profiles of the strip and the complementary profiles of the product, which may also have been equipped with said fastener strips in the same manner by means of pressure sensitive adhesive.

In FIGS. 11 and 12 a device 85 is schematically depicted which is especially suitable for attaining accurate placement and attachment of a flanged flexible separable fastener strip 86 onto a web 87 by means of adhesive 88 while the fastener strip and web are in high speed concurrent forward movement indicated by the directional arrows. For this purpose, the web 87 which may be of any preferred material, whether extruded plastic film or non-plastic or a combination of plastic and non-plastic materials, is supported and travels along a member 89 which may be flat as shown or may comprise a roller, if preferred. For guiding the fastener strip 86 convergently toward the web 87, a stationary member 90 is supported by means of a suitable frame 91 in such relation to the support and guide 89 that an oblique surface 92 facing toward the member 89 will receive and guide the flange body portion of the fastener 86 to meet the web 87. For accurate lateral guidance of the fastener strip 86, a longitudinal guide groove channel 93 in the guide member 90 receives a profile 94 that is integral with the strip 86. Side walls 95 in the groove 93 provide spaced guide surfaces between which the profile 94 is guided in fairly close relation so as to move freely but with substantial accuracy into the longitudinal position desired on the web 87. It will be understood that although the profile 94 is shown as of the female form, it may as well be a male configuration of profile, and where desired a similar device may be provided for simultaneously applying a fastener strip having a mating profile to the same web at a different location, or the profile 94 may be of the multi-hook and groove type, or two or more of the grooves 93 may be provided in the member 90 to handle a corresponding number of the profiles on the same or different strips simultaneously, all as preferred for any particular intended purpose.

Adjacent to convergence of the fastener strip with the web, and preferably adjacent to the rear end of the member 90, a thin layer of the adhesive 88 is applied by means of a nozzle 97 to either or both of the interface surface areas 96 of the strip 86 and the web 87 but preferably to the back of the strip 86 for reasons previously discussed herein. The nozzle 97 may be supported by the frame 91 substantially as shown, and it may be supplied with fluid adhesive from a suitable source through a duct 98. In order to avoid lateral flow of the layer strip of the adhesive 88 beyond the longitudinal edges of the strip 86, the nozzle orifice 99 is substantially accurately located and dimensioned and the rate of adhesive flow is controlled so that width of the adhesive layer is narrower than the width of the strip 86 and sufficiently spaced inwardly from the longitudinal edges of the strip, at least at the point of application from the nozzle orifice 99 so that even though there may be some lateral migration of the adhesive 88 before it is set, none of the adhesive will escape beyond the longitudinal edges of the strip 86. This assures freedom from fouling of the device 85 or other parts of apparatus with which the device 85 may be associated. It will be understood, of course, that the velocity and character of the adhesive 86 applied by means of the nozzle 97 will be controlled to avoid excessive extrusion of adhesive to the travelling strip 86 and web 87 and to apply just the optimum quantity of adhesive to serve the purpose.

Where it is desired to produce bags in which a pull-apart separable fastener closure 100 (such as is illustrated in FIG. 13) is secured to bag wall panels 101, a guide device 102 may be employed for efficiently guiding the fastener assembly before or after or during application of layers of adhesive 103 for affixing flanges 104 and 105 of the fastener assembly to aligned marginal portions of the bag wall panels 101. The layers of bonding adhesive 103 are desirably sufficiently narrower, as shown, than the distance between the edges of the webs 101 and the edges of the flanges 104 and 105 to avoid lateral escape of the adhesive layers beyond the edges of the webs and flanges. The fastener 100 may comprise complementary extrusions in which the flange 104 has along its outer edge a coextensive lip-like pull flange extension 106 with a multihook and groove separable fastener profile 107 hingedly and integrally connected at juncture of the flange 104 and extension 106 and normally turned back as a flap along the inner face of the flange 104 and separably coupled to a complementary rib and groove profile 108 integral with the flange 105 and providing a longitudinal shoulder 109 facing in spaced relation toward the adjacent edge of the associated web 101. A pull flange extension 110 extends from the profile 108 in spaced preferably parallel relation to the pull flange 106.

Construction and arrangement of the device 102 is such that not only will it substantially accurately guide the separable fastener assembly 100, but will accommodate desired variations in width and thickness of the fastener 100. For this purpose, the device 102 comprises a guide plate 111 which may be fixedly connected to a rigid support 112 which may also serve as a back-up and alignment control for an adjustable plate 113 in spaced cooperative and preferably coextensive relation to the companion guide plate 111. A shoulder 114 on the guide plate 111 is adapted to oppose the fastener profile shoulder 109. A width gauge and guide element 115 between the plates 111 and 113 not only defines the spacing between the guide plates to be complementary to the thickness of the profile portion of the closure 100, but also serves as a guide for the free edge of the pull flange 106 so that between the guide element 115 and the shoulder 109 and the confronting surfaces of the guide plates 111 and 113, the profile portion of the fastener 100 is substantially accurately guided for longitudinal travel relative to apparatus mechanism of any preferred form (not shown) for bringing the webs 101 into assembly with the flanges 104 and 105 and supplying the adhesive 103 for securing the web and fastener parts together. By varying the width of the spacing gauge and guide element 115, any thickness of profile section can be accommodated for the closure assembly 100, and by adjusting the element 115 relative to the shoulder 109 any preferred width of the profile portion of the closure 100 can be accommodated. To enable adjustment, the plates 111 and 113 and the element 115 are secured together by means such as one or more bolts 116 extending through the elements 115 and through adjustment slots 117 in the plates 111 and 113. The bolt means 116 not only secure the element 115 fixedly in place, but also secure the plate 113 fixedly in relation to the plate 111 and the support 112.

So-called hot melt adhesives are especially useful for adhesive bonding of the fastener strips to the webs according to the present invention. Such adhesives are available from many sources. A clear transparent adhesive has been found especially satisfactory not only because of its lack of disfiguring coloration where either or both the web and the fastener may be transparent. A thermofusible synthetic resin adhesive having a desirable viscosity at utilization temperature of 150° to 190° C. permits advantageous closely controlled thin layer nozzle application to a thickness of, for example, 1/10 mm at a speed of up to 300 m per minute without dripping or running, and attains instantaneous adhesive bond. Rapid setting of the adhesive to completion in 3 to 5 seconds is desirable. Such adhesive also meet the qualification of adequate tackiness to resist slippage from the point of interface contact of the parts to complete permanent bonding set of the adhesive. After setting, the adhesive must retain the bond permanently without deterioration, and remain pliable in the bond consistent with the flexibility of the fastener and web assembly.

Of course, where a pressure sensitive adhesive is applied to the back of the fastener strip, according to the modification of FIG. 10, and wherein the adhesive must remain tacky at least while attached to the protective, strippable backing web, a pressure sensitive adhesive of any preferred known type such as applied to pressure sensitive tapes may be used.

It will be understood that variations and modifications may be effected without departing from the spirit and scope of the novel concepts of this invention.

I claim as my invention:

1. A method of attaching to a prefabricated flexible web a first prefabricated flexible separable plastic fastener strip having an interlocking profile projecting in a direction away from an oppositely facing interface surface area of the strip, and the profile being adapted for interlocking with a complementary second flexible separable fastener profile, comprising:

guiding the web and the fastener strip travelling at the same high speed and continuously in operation convergently toward one another and joining said interface surface area of the fastener strip to an interface surface area of said web;

utilizing said profile as guide means for guiding the fastener strip in movement into said convergence with said web;

continuously in operation applying a thin layer of quickly tacky adhesive to at least one of said interface surface areas as close as practicable to the convergent joining of the web and strip so that the adhesive will reach the joining while tacky, and effecting said applying of the adhesive in a manner assuring that the adhesive will be adheringly effective on the interface area of the fastener strip directly back of and aligned with said profile;

and pressing said strip and said web together and thereby effecting attachment of said interface surface areas to one another by means of the adhesive layer while the web and fastener strip continue travelling jointly at said high speed.

2. A method according to claim 1, comprising guiding said web and a plurality of spaced parallel complementary profiled fastener strips at said substantially continuous high speed of travel, applying the adhesive to interface surface areas of the web and of each of the strips in a manner assuring that the adhesive will be adheringly effective on the interface areas of the fastener strips directly back of and aligned with the profiles of both the fastener strips so that the backs of the profiles will be directly adhesively secured to the web, utilizing the profile of each of said fastener strips for guiding said strips into convergence with the web, pressing both of the strips and the web together and effecting permanent securement of the interface areas of the plurality of strips to the interface areas of the web by means of the adhesive, and folding the web longitudinally.

3. A method according to claim 1, comprising projecting said profile into a guide groove of a roll and thereby utilizing said profile for guiding, and pressing said fastener strip including said profile toward said web for effecting said attachment.

4. A method according to claim 1, comprising receiving the fastener profile fairly closely in a guide groove in a stationary guiding member and thereby utilizing said profile as guide means.

5. A method according to claim 1, comprising utilizing said profile as guide means by receiving the profile in a profile guide groove in a stationary member converging obliquely toward a pressing relationship with a web guiding member and thereby effecting said pressing of the strip and web together.

6. A method according to claim 5, comprising applying said thin layer of adhesive from nozzle means supported by frame means which also support said stationary member.

7. A method of attaching prefabricated flexible web and prefabricated separable fastener strips having interlocked separable profiles, comprising guiding the interlocked fastener strips as an assembly in longitudinal movement through a guide device having surfaces adapted to cooperate with the fastener strips; and relatively adjusting said surfaces to accommodate various widths of said fastener strips.

8. A method according to claim 7, including effecting adjustments also for various thicknesses of the interlocked fastener strips.

9. A method according to claim 8, wherein said device comprises variably spaceable plates between which said interlocked profile fastener strips are adapted to be received, effecting said thickness spacing by means of a replaceable spacer member engaged between said plates, and effecting said adjustment for different widths by adjusting a bolt in slots in said plates.

10. A method of attaching prefabricated bag making plastic film to prefabricated resiliently flexible fastener strips, comprising:

folding a continuously travelling plastic film and guiding opposite folded panels of the film convergently toward one another and into face-to-face contiguity;

delivering into the convergence of said panels separably interlocked fastener profile strips having oppositely facing base surfaces engaged by the respective panels;

and applying to said base surfaces adhesive at a location in advance of engagement of said surfaces by said film panels so that the film panels are adhesively secured to the strip base surfaces at said convergence at which said interlocked fastener strips are sandwiched between said panels.

11. A method according to claim 10, which comprises applying said adhesive in a heated state from adhesive applicator nozzles, and offsetting said nozzles relative to one another in the direction of advance of the web panels and the interlocked fastener strips so that the heat from the adhesive applied by the respective nozzles will not be concentrated but will be spaced longitudinally along the strips.

12. A method of attaching to a prefabricated flexible web a first prefabricated flexible separable fastener strip having an interlocking profile projecting away from a base surface area of the strip and the profile being adapted for interlocking with a complementary second flexible separable fastener profile, comprising:

guiding the web and the fastener strip at high speed and continuously in operation convergently toward one another for joining the base surface of the fastener strip to said web;

in advance of said joining applying adhesive means to said base surface continuously directly in back of and in alignment with said profile;

and at said joining securing the strip by the adhesive means to the web so that bonding of the strip to the web occurs directly in aligmnent with said profile.

13. A method of attaching to a prefabricated flexible web prefabricated flexible separable fastener strips having separably interlocked profiles, comprising:

moving the web and the interlocked fastener strips at high speed and continuously in operation in the same direction and adjacent to one another;

folding said web along a longitudinal axis to form two plys and guiding the two plys convergently toward one another;

directing said fastener strips into the convergence of said plys;

applying adhesive to the backs of said profile strips from respective adhesive applicator nozzles which are offset relative to one another in the direction of advance of the web plys and the strips;

and in stopping movement of said web and strips deflecting said strips and substantially removing the strips from the adhesive application field of said nozzles.

14. A method according to claim 13, comprising effecting said deflecting of said strips by operating plate means engaged between spaced surfaces of the strips alongside said profiles.

15. A method of attaching to a continuously moving prefabricated flexible web continuously cotravelling fastener strip means having a surface for attachment to said web, comprising:

moving the web and fastener strip means into convergence applying adhesive to the moving fastener strip means from adhesive applicator means located along the path of movement of the fastener strip means;

and effecting deflection of the strip means relative to said adhesive applicator device when stopping movement of said fastener strip means.

16. A method according to claim 15, comprising effecting said deflecting by operating strip means guide plate structure.

17. A method according to claim 15, wherein said device comprises respective adhesive applicator nozzles which are offset relative to one another in the direction of advance of the web and the strip means, and effecting said deflection of the strip means by operating deflecting means intermediate said nozzles and thereby removing the strip means from the adhesive application field of said nozzles when stopping movement of said strip means.

* * * * *